April 12, 1932.　　P. P. BARTHELEMY　　1,853,716
HAND BRAKE
Filed Oct. 29, 1928　　2 Sheets-Sheet 1
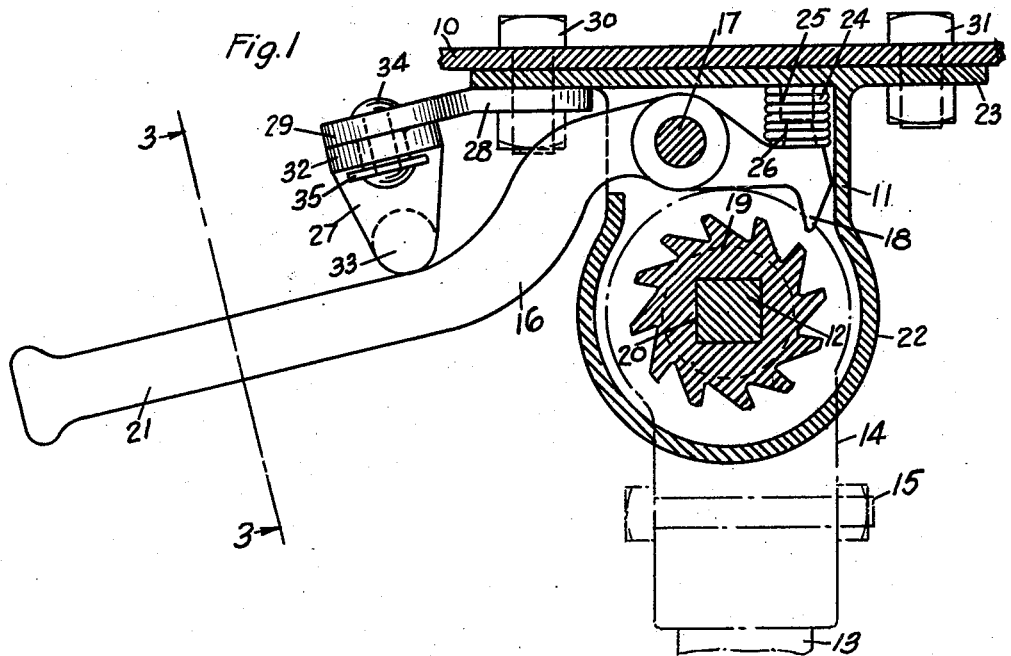
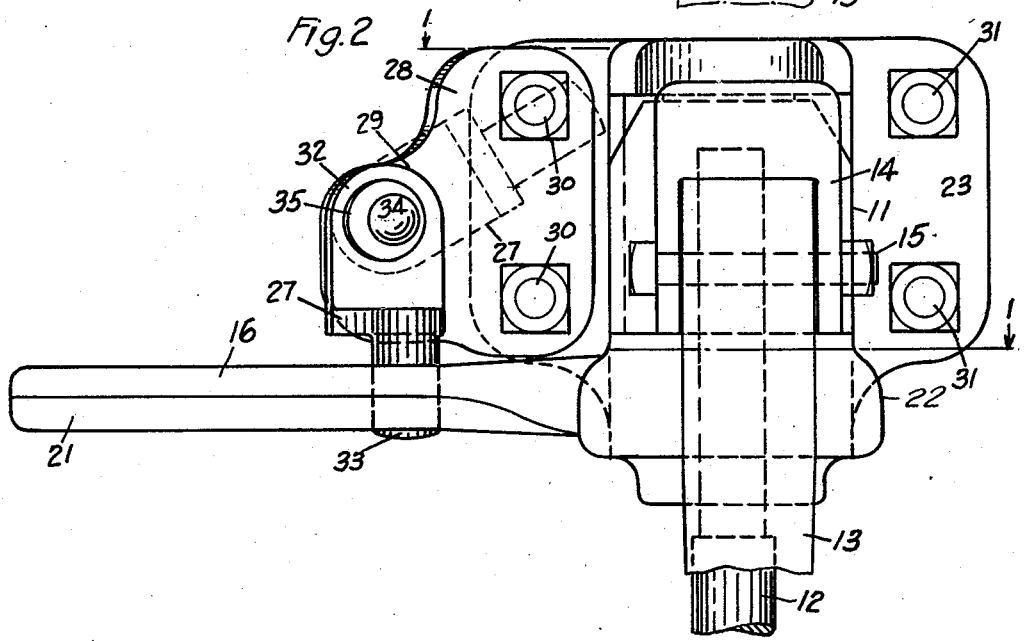
Witness
Hans M. Rachlitz
Inventor
Paul P. Barthelemy
By Joseph Harris
His Atty.

April 12, 1932. P. P. BARTHELEMY 1,853,716
HAND BRAKE
Filed Oct. 29, 1928  2 Sheets-Sheet 2
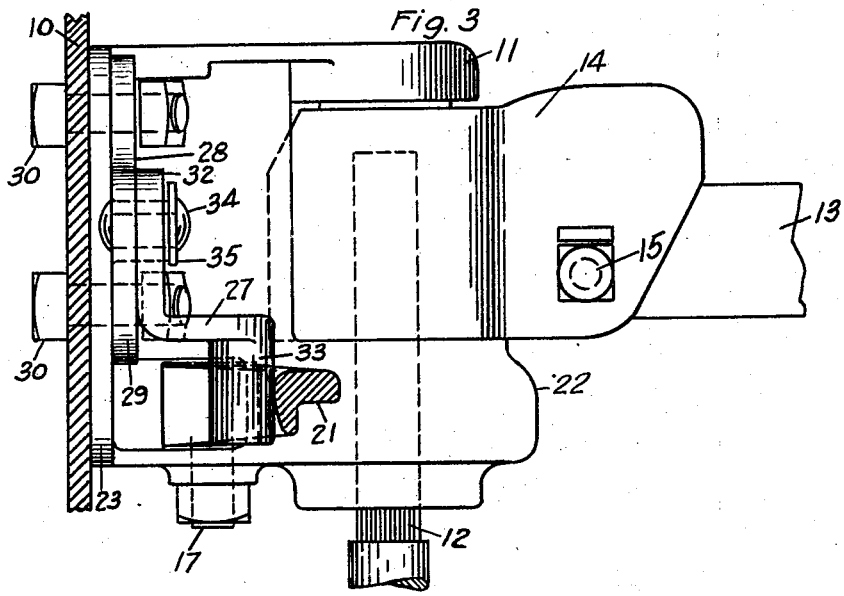
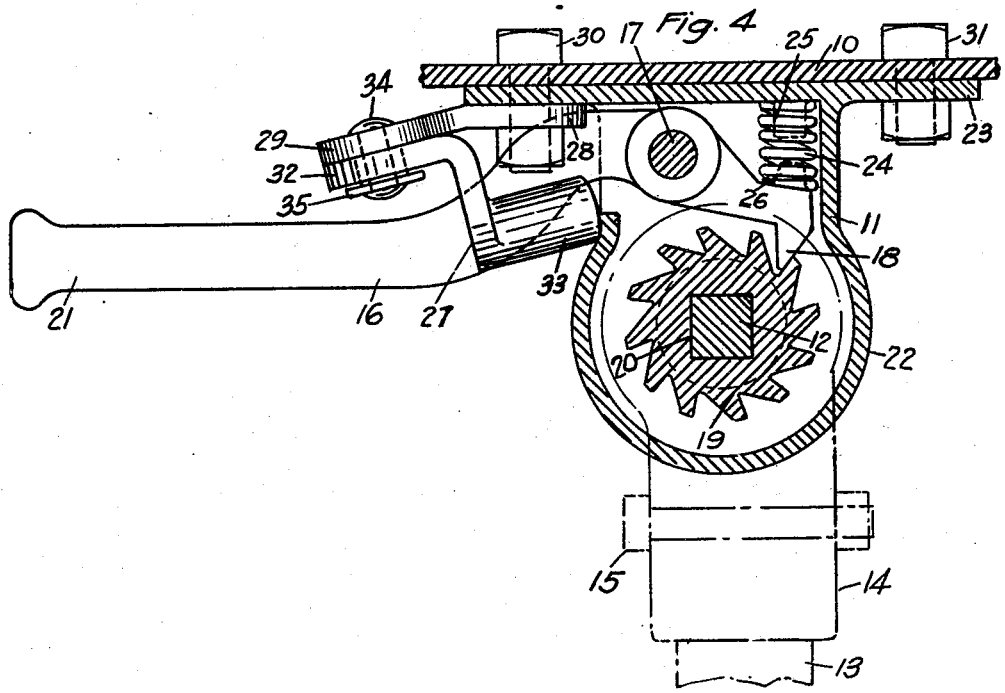
Inventor
Paul P. Barthelemy
By Joseph Harris
His Atty.
Witness
Hans M. Rachlitz Patented Apr. 12, 1932

1,853,716

UNITED STATES PATENT OFFICE

PAUL P. BARTHELEMY, OF ST. PAUL, MINNESOTA, ASSIGNOR TO W. H. MINER, INC., OF CHICAGO, ILLINOIS, A CORPORATION OF DELAWARE

HAND BRAKE

Application filed October 29, 1928. Serial No. 315,644.

This invention relates to improvements in hand brakes.

One object of the invention is to provide a hand brake for railway cars, including a staff on which the brake chain is wound, lever operated ratchet means for rotating the staff to tighten the brakes, and a locking dog cooperating with the ratchet means on the brake staff to hold the latter against retrograde movement, the dog being provided with an operating handle by which the same may be manually released, wherein manually operated latch means is provided for locking or holding the dog in released or inoperative position.

A more specific object of the invention is to provide a simple and efficient locking means of the character indicated, for the locking dog of hand brake mechanisms, wherein the locking means is in the form of a pivoted latch element adapted to be manually swung in position to engage the operating handle of the locking dog to hold the dog disengaged from the locking ratchet means provided on the winding staff of the brake.

In the drawings, forming a part of this specification, Figure 1 is a horizontal, sectional view through a portion of the end wall of a railway car and the housing of a hand brake, illustrating my improvements in connection therewith. Figure 2 is an elevational view of the upper end portion of the hand brake mechanism shown in Figure 1. Figure 3 is a vertical, sectional view, corresponding substantially to the line 3—3 of Figure 1. And Figure 4 is a horizontal, sectional view, similar to Figure 1 but showing the parts in a different operative position.

In said drawings, the end wall of the car is designated by 10, to which the hand brake mechanism is secured. The hand brake mechanism includes a housing 11 in which the upper end of the usual vertical brake staff 12 is rotatably mounted. The brake staff 12 is provided with a square section at the upper end which is connected to the usual ratchet wheel operated by the lever operated pawl mechanism of the hand brakes. In the present instance, the lever is shown as of the drop-handle type and comprises an elongated lever member 13 in the form of an operating handle which is pivoted to a rotatable carrier 14 by a bolt 15. The carrier 14 is mounted within the housing in the usual manner and, inasmuch as the pawl and ratchet mechanism is of the usual type, the same is not illustrated in the present instance.

In carrying out my invention, I provide a pivoted locking dog 16 for preventing retrograde movement of the brake staff and maintain the brakes in locked condition. The locking dog is pivoted between its ends on a vertically disposed pivot pin 17, suitably secured within the housing 11. At the inner end, the dog 16 is provided with a locking tooth 18 which engages with a locking ratchet member 19 secured to the brake staff 12, the ratchet member 19 being provided with a square opening 20 accommodating the square upper end section of the staff. As shown, the locking dog 16 is provided with an arm at the end opposite the tooth 18 which projects outwardly of the housing and forms an operating handle member 21. As shown, the handle member 21 is offset outwardly away from the wall 10 of the car.

The housing 11 preferably comprises an enclosing vertical wall 22 which contains the operating mechanism for the hand brakes and a vertical plate-like flange section 23 which is secured to the end wall 10 of the car. As shown in Figures 1 and 4, the locking dog 16 is urged into locking engagement with the ratchet member 19 on the brake staff by a spring 24 which is interposed between the wall 23 of the housing and the rear side of the ratchet tooth portion of the locking dog, bosses 25 and 26 being provided on the wall 23 and the locking dog respectively, to hold the spring 24 centered.

In Figure 1, the locking dog 16 is shown as disengaged from the ratchet member 19 so that the brake staff is free to rotate to permit unwinding of the brake chain. In order to maintain the locking dog in this position, I provide latching mechanism including a pivoted latching finger 27 which is supported from the housing by a bracket plate 28. The plate 28 comprises a main body portion which is directly secured to the section 23 of the housing and an angularly projecting supporting lug portion 29 on which the finger 27 is pivotally hung. The main body portion of the bracket 28 is secured to the section 23 of the housing by means of bolts 30—30 which extend through said main body portion, the section 23 and the end wall 10 of the car. It will thus be clear that the bolts 30 serve to secure the housing to the end wall of the car in addition to fixing the bracket 28 to the housing. The section 23 of the housing at the side opposite to that on which the bracket 28 is located is also secured to the end wall of the car by bolts, the latter being designated by 31—31.

The latch finger 27 comprises an end section 32 by which the same is pivotally supported, and an offset cylindrical portion 33 which forms a weighted end and is adapted to engage in back of the handle member 21 of the locking dog 16 to latch the same in release position, as shown in Figure 1. The section 32 is connected to the lug portion 29 of the bracket 28 by a pivot pin 34; the pivot pin 34 is preferably in the form of a rivet and carries a wear disc or washer 35 interposed between the front face of the section 32 and the head at the outer end of said rivet. As will be evident, when the latch finger 27 is swung to its lowermost position, it will be maintained there by the force of gravity. In order to permit inward swinging movement of the handle member 21 of the locking dog 16 to allow the tooth 18 of the dog to cooperate with the ratchet member 19, the latch finger 27 is swung upwardly to disengage the same. To maintain the finger 27 in inoperative position, the same is swung upwardly and inwardly to one side of the pivot member 34 with the free end in abutting relation with the side wall of the housing 11, as most clearly illustrated in Figures 2 and 4. As will be evident, due to the overbalanced condition of the latch finger 27 in the inoperative position shown in Figures 2 and 4, there will be no danger of the finger accidentally dropping to the pendant position shown in Figures 1 and 3 to latch the dog 16 in disengaged position.

The hand brake is operated in the usual manner by oscillating the operating handle 13, thereby producing intermittent rotation of the brake staff 12 in a winding direction.

During the intermittent rotation, the dog 16 is in the operative position shown in Figure 4 and the tooth 18 thereof ratchets over the teeth of the ratchet member 19. As soon as the tightening operation is discontinued, the dog 16 prevents retrograde movement of the winding staff by engagement of the tooth 18 thereof with one of the teeth of the ratchet member 19. When it is desired to release the brakes, the operator swings the handle 21 of the dog outwardly, thereby disengaging the locking tooth 18 of the dog from the ratchet member 19. When it is desired to hold the dog thus disengaged so that the staff will be free to rotate, the operator swings the latching finger 27 in a contra-clockwise direction from the dotted line position shown in Figure 2 to the pendant full line position shown in Figures 1, 2 and 3, with the portion 33 of the latching finger in engagement with the rear edge portion of the operating lever, thereby preventing inward movement of the operating lever 21 toward the wall 10 of the car and thus holding the tooth of the locking dog in the disengaged position shown in Figure 1. When it is again desired to bring the locking dog 16 into operative relation with the brake staff, the latching finger 27 is swung upwardly to the position shown in Figure 2. As will be evident, the locking dog is then free to oscillate and is urged into engaged position with the ratchet member of the brake staff by the spring 24.

From the preceding description, taken in connection with the drawings, it will be evident that I have provided an exceedingly simple and efficient latching means for the locking dog of a hand brake, which may be readily attached to the housing of the hand brake mechanism and is secured by the same bolts which secure the housing to the end wall of the car.

A further advantage of my inproved latching mechanism is that there is no danger of the same being accidentally displaced from either its operative or inoperative position, the same being maintained in either of said positions due to the influence of gravity and it requiring manual manipulation to bring the same into the latching position for holding the dog disengaged from the brake staff and also to bring the same to the inoperative position where the locking dog is free to engage the brake staff and prevent retrograde movement thereof.

While I have herein shown and described what I consider the preferred manner of carrying out my invention, the same is merely illustrative and I contemplate all changes and modifications which come within the scope of the claims appended hereto.

I claim:

1. In a hand brake mechanism, the combination with a vertical brake staff upon which the brake chain is wound; of a housing in which the operating mechanism for the staff is mounted; a locking dog pivoted between its ends on a vertically disposed pivot member fixed within the housing, said dog having a tooth at one end and operating handle portion at the other end, said tooth being engageable with the brake staff to lock the same against retrograde movement; means for holding the tooth yieldably engaged with the staff, the handle member of the dog being manually movable to disengage the dog from the staff; a latch member pivotally supported at one end above said handle and adapted to be swung in back of the handle, and extending across the path of swinging movement of the handle in engagement therewith when in pendant position to latch the dog in disengaged position, the latch member being retractable from latching position and movable on its pivot to a position to bring the main body portion thereof above and to one side of the pivot with the free end in abutment with the housing, thereby maintaining the latch member in inoperative position.

2. In a hand brake mechanism, the combination with a vertically disposed brake staff upon which the brake chain is adapted to be wound; of a housing in which the upper end of the staff is rotatably mounted, said housing being provided with a vertical wall; operating means for the brake staff, rotatably supported in the housing; a locking dog in the housing, pivotally supported between its ends, one end of the dog extending outwardly of the housing and forming an operating handle and the other end of the dog co-operating with the staff to lock the same against retrograde movement; spring means for forcing said dog into engagement with the staff, said dog being manually disengaged from the staff by pulling said handle outwardly, thereby unlocking the dog and permitting unwinding of the chain from the staff; a latch pivotally supported on the housing above the handle, said latch being movable to dispose the main body portion thereof above the pivot and to one side thereof, with its free end in abutting relation with the vertical wall of the housing to thereby retain the latch in inoperative position under the influence of gravity, said latch being manually movable from said inoperative position to pendant position in back of the handle and extending across the path of swinging movement thereof to be engaged by the handle to limit its swinging movement and maintain the dog disengaged from the brake staff.

In witness that I claim the foregoing I have hereunto subscribed my name this 15th day of Oct. 1928.

P. P. BARTHELEMY.